United States Patent

[11] 3,612,673

[72] Inventor Ivars M. Skuja
    Seattle, Wash.
[21] Appl. No. 3,569
[22] Filed Jan. 9, 1970
[45] Patented Oct. 12, 1971
[73] Assignee Audiscan, Inc.
    Bellevue, Wash.
    Continuation of application Ser. No.
    653,137, July 13, 1967, now abandoned.

[54] FILM ADVANCE MECHANISM
    17 Claims, 15 Drawing Figs.
[52] U.S. Cl. .................................................. 352/225,
                                              352/78 R, 352/191
[51] Int. Cl. ...................................................... G03b 1/48,
                                                    G03b 1/18
[50] Field of Search .......................................... 352/225,
                            221, 229, 191, 72, 77, 78; 353/95

[56]                References Cited
            UNITED STATES PATENTS
2,063,016  12/1936  Ames .............................  352/225
2,374,828   5/1945  Miller ............................  352/227
2,587,123   2/1952  Dunning et al. ..............  352/191 X
3,259,451   6/1966  Fairbanks et al. ............  352/225
3,418,045  12/1968  Rovsek ..........................  352/169 X
            FOREIGN PATENTS
  579,341   7/1946  Great Britain ................  352/191

Primary Examiner—Louis R. Prince
Assistant Examiner—Joseph W. Roskos
Attorney—Seed, Berry, Dowrey & Cross ABSTRACT: A film advance mechanism of two sections. The two sections are provided with two adjacent inner surfaces that guidingly advance film frame by frame, gate the film during advancement and mask the images for projection.. Cooperating teeth are provided on the inner surfaces to engage the film sprocket holes of the film for advancing the film. The teeth extend into notches formed in the inner surfaces of the opposite sections.

PATENTED OCT 12 1971
3,612,673
SHEET 1 OF 3
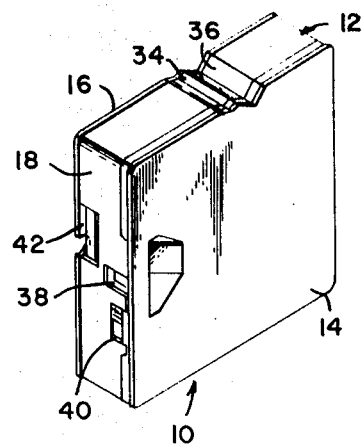
FIG__1
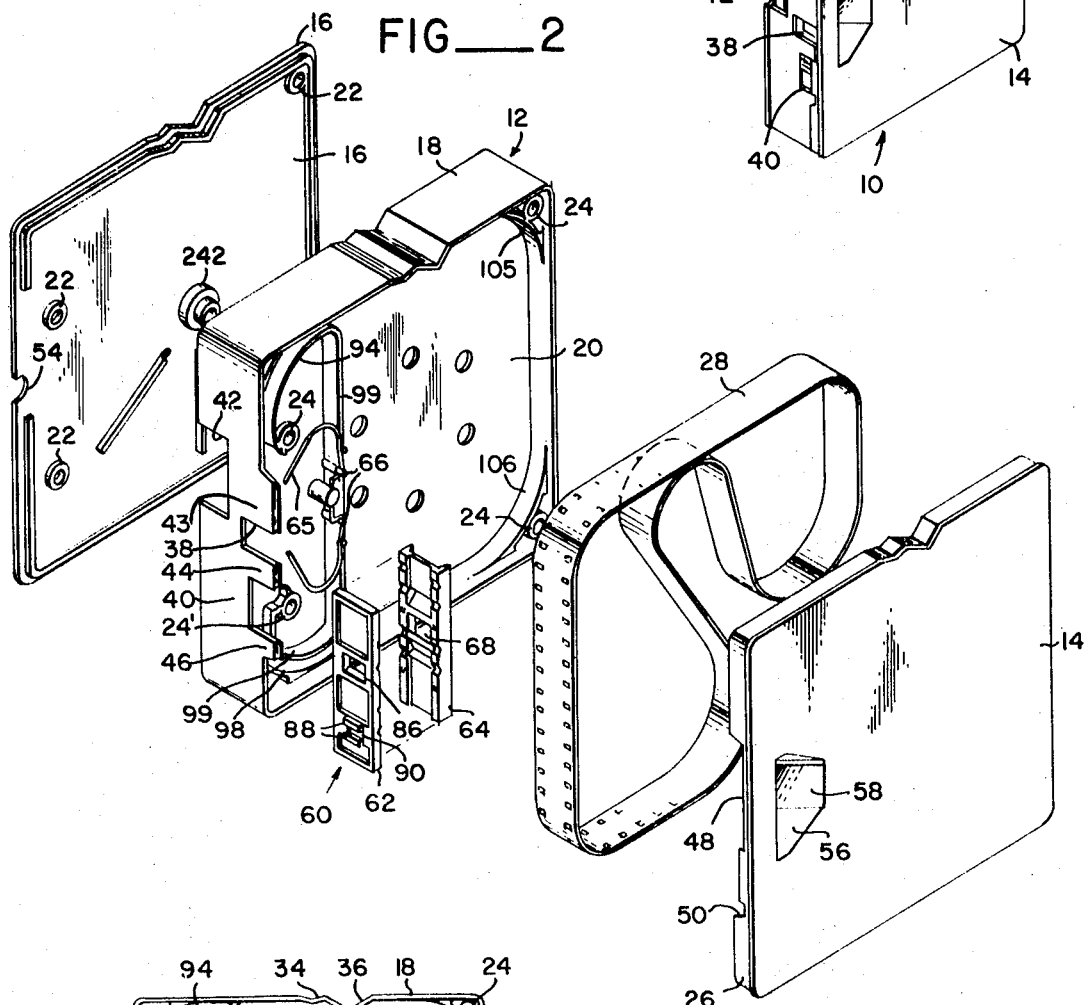
FIG__2
FIG__3
IVARS M. SKUJA
INVENTOR.
BY Seed, Berry & Downey
ATTORNEYS

PATENTED OCT 12 1971
3,612,673
SHEET 2 OF 3
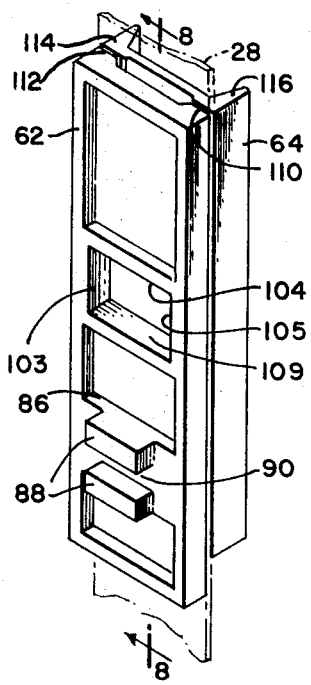
FIG__4
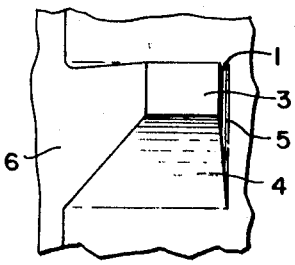
FIG__10
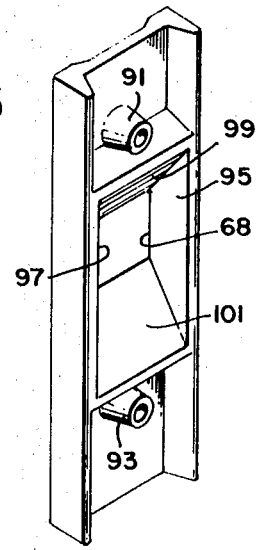
FIG__5
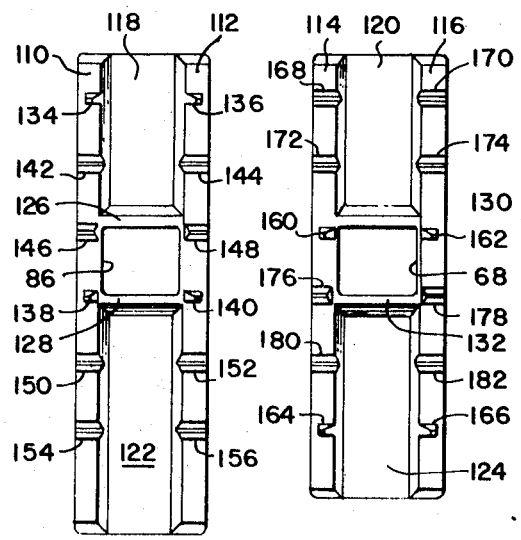
FIG__6  FIG__7
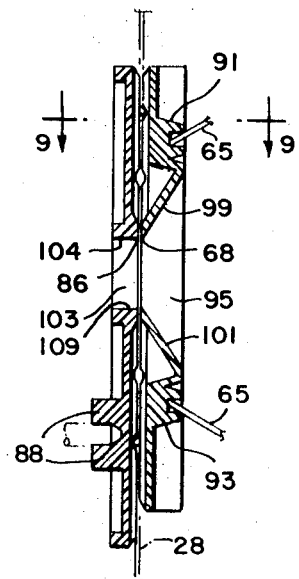
FIG__8
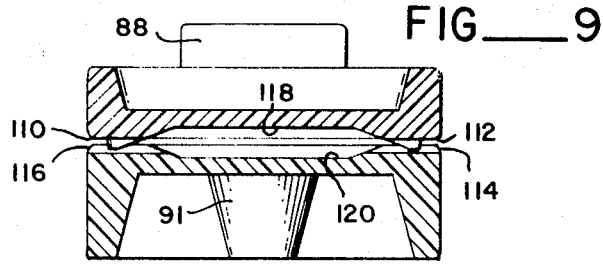
FIG__9
IVARS M. SKUJA
INVENTOR.
BY *Sped, Berry & Downey*
ATTORNEYS

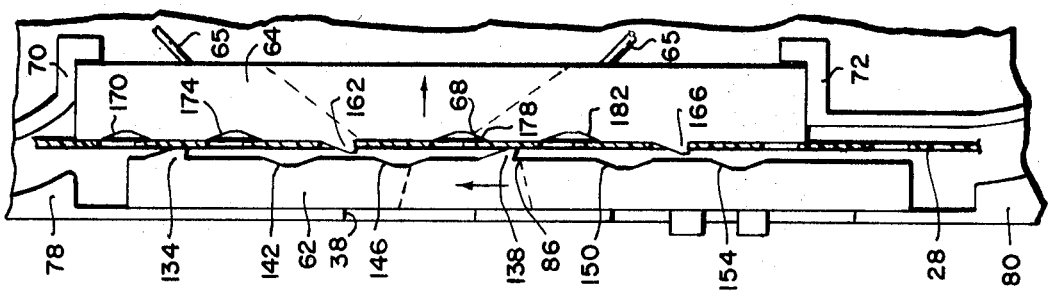
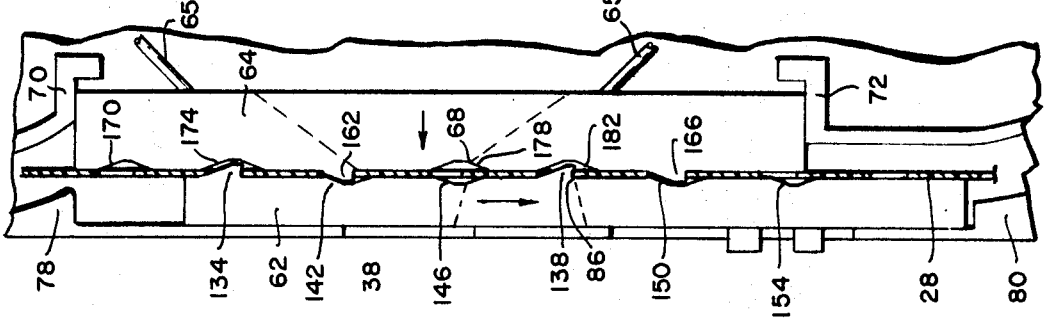
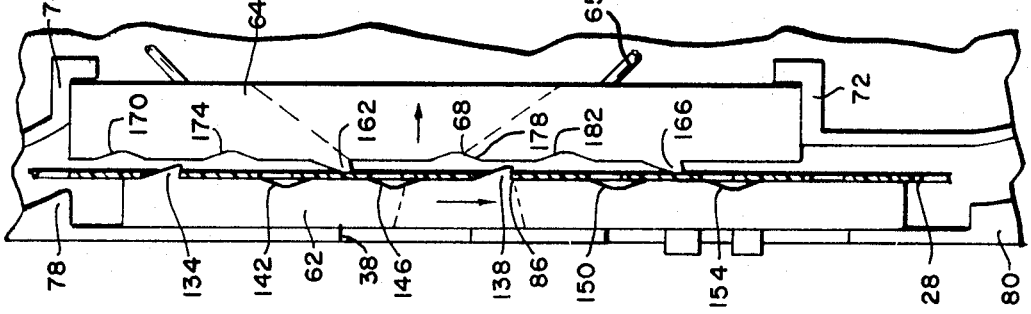
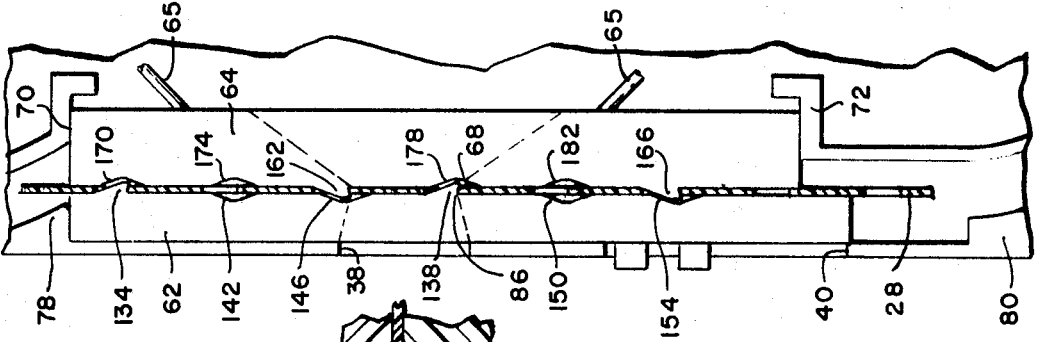
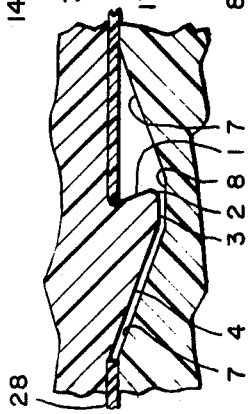

FILM ADVANCE MECHANISM

This application is a continuation of my earlier application, Ser. No. 653,137, filed July 13, 1967, and now abandoned.

Film projection systems have heretofore employed film-advancing mechanisms of the sprocket wheel or finger type that move along complex, nonlinear paths to engage, disengage and reengage the film sprocket holes to advance the film. Furthermore, such systems have employed means other than the film-advancing mechanisms to gate either the illumination to the film or the image to the screen, and to mask the projected image. Consequently complicated interlocks must be employed to synchronize the film advance function with the gating and image masking functions if a satisfactory film presentation is to be made. Attempts at simplification have included eliminating the gating function altogether and simply advancing the film. This, however, produces the distracting effect of two film frame images at once on the screen, one image moving onto the screen as the other moves off.

These above-mentioned problems become considerably more complicated in cartridge film projection systems wherein a film cartridge is inserted into a projector and properly aligned for film projection. Heretofore in these systems, cartridge alignment was critical if the film was to be properly advanced and advanced without injury.

A primary object of this invention is to provide a film advance assembly that does not suffer from the deficiencies noted above. Another object is to provide such an assembly that incorporates the gating and masking functions. A further object is to provide such an assembly that can be employed in a cartridge projection system.

These and other objects and advantages will become apparent from the following description, taken in conjunction with the accompanying drawings, of which:

FIG. 1 is a perspective view of the film side of a preferred film projection cartridge for use with this invention;

FIG. 2 is an exploded assembly view of the film side of the FIG. 1 cartridge as adapted for an endless filmstrip;

FIG. 3 is a plan view of the film side of the FIGS. 1–2 cartridge with the film side cartridge cover removed;

FIG. 4 is a perspective view of a preferred film advance and image-gating assembly for use with the cartridge of this invention; illustrating in phantom a film segment confined between the front and back gate components of such assembly;

FIG. 5 is a perspective view of the back, or outer, side of the back gate component of the FIG. 4 assembly;

FIG. 6 is a plan view of the inner or film side face of the front gate component of the FIG. 4 assembly;

FIG. 7 is a plan view of the inner or film side of the back gate component of the FIG. 4 assembly;

FIG. 8 is a side cross section taken along the line 8—8 of FIG. 4;

FIG. 9 is an enlarged end cross section taken along the line 9—9 of FIG. 8;

FIG. 10 is an enlarged detail plan view of one of the gate components illustrating a typical film sprocket-hole-engaging element of such gate component;

FIG. 11 is an enlarged side detail view in cross section of the front and back gate components illustrating the film-engaging interaction between the two components; and FIGS. 12–15 are partially schematic elevation views showing, in sequence, the operation of the FIG. 4 assembly through one film advance cycle.

This invention comprises a film advance and image-gating assembly for use in a projection system to engage the film sprocket holes to advance the film, gate the film images during film advancement and mask the images during projection. This assembly can be employed with motion picture film and with filmstrips.

This assembly comprises two sections hereinafter called a "front gate member" and a "back gate member", respectively, that are of about the same width as the film and that cooperate to receive the film between their adjacent inner faces, and to guidingly advance film past an image projection aperture within a projection system, gate the image during film advancement, and mask the projected image.

Although the film advance and image gating assembly of this invention is preferably included, in toto, within a film projection cartridge and is so described herein in detail, it should be understood that its application is not restricted to such use. These sections may be mounted entirely within a projector, or they both may be mounted in a removable film projection cartridge and coupled to an actuating mechanism when inserted into a suitable projector, or one may be mounted in a projector and the other mounted in a removable film projection cartridge in which case the two sections would coact to guidingly advance the film upon insertion of the cartridge into the projector.

Because of the unique design of these sections, the alignment and film damage problems created by placing one section in a projector and the other section in a cartridge are minimal. Consequently, since a cartridge incorporating only one of the gate members would be less expensive to manufacture, it may be desirable to separate the locations of the gate members in this manner.

In FIGS. 1–3, an exemplary film projection cartridge 10 is shown as comprising a cartridge housing composed of a film and sound tape container 12, a film side housing cover 14 and a tape side housing cover 16. The container 12 has a peripheral wall 18 and a center partition wall or web 20 that divides the container into side-by-side, wall-enclosed film and tape halves. The covers are adapted to be positioned against the container and held in place by screws 21 that extend through bosses 22 in the tape side cover and bosses 24, 24′ in the container and thread into bosses 27 in the film side cover. The combined width of the peripheral wall 18 and the lip 26 on the film side cover is sufficient to accommodate the width of the filmstrip, and the width of the peripheral wall is also sufficient to accommodate the width of sound tape 30 and its storage and dispensing assembly 32.

The upper side of the peripheral wall 18 of container 12 and the corresponding edge sections of covers 14–16 are notched with two parallel, transverse notches (as at 34 and 36 in FIG. 1). The forward notch 34 is shallower than the rearward notch and serves to position or index the cartridge in a cooperating projector in a standby or transport nonprojecting condition. The rearward notch 36 serves to position or index the cartridge in a projecting condition within such a projector.

The forward side of the peripheral wall 18 is provided with an upper film side image-projecting aperture 38, a lower film side-actuating aperture 40, and a tape side tape drive and sound-head-receiving aperture 42 that are closed on their respective vertical outer edges by the respective covers 14 and 16 in the assembled cartridge. The outer edges of the film half of peripheral wall 18 above aperture 38 and below aperture 40 are recessed relative to the edge sections 43, 44 and 46 immediately above aperture 38, below aperture 40 and between apertures 38 and 40, respectively, to receive lip 26 of cover 14. The edges of lip 26 are recessed at 48 and 50 to receive these protruding sections of wall 18. The aperture 38 is closed by the cover edge in the recessed lip section 48. The aperture 40 is closed and partially obstructed by a nonrecessed section 52 of lip 26 between recessed lip sections 48 and 50. In the assembled condition, the apertures 38 and 40 are centered relative to the filmstrip edges.

The forward edge of the tape side cover 16 is provided with a circular cutout 54 adjacent to the lower edge of the aperture 42 to receive a capstan tape drive.

The sidewall of cover 14 is provided with a recess 56 containing an opening and a reflection mirror 58 mounted therein to reflect an external projection light beam (from a lamp mounted in a suitable projector) at right angles through the film image and through the aperture 38.

Because the cartridge is designed as described above with the operating apertures 38, 40, 42 in the forward or front wall of the cartridge, the cartridge can be inserted into operable position within a suitable projector simply by sliding it straight into the projector. There is no need to maneuver the cartridge in some complex fashion in order to properly align its operating apertures within the projector.

The structure within the film side of the container 12 is as follows.

A film advance and image-gating assembly 60 is positioned inside of the container against the forward side of the peripheral wall 18. This assembly, described in greater detail subsequently, comprises two sections hereinbefore called a "front gate" 62 and a "back gate" 64 that are of about the same width as the film and that cooperate to guidingly advance the film past the aperture 38, gate the image during film advancement, and mask the projected image. The filmstrip 28 passes between the adjacent inner faces of these sections as shown in FIG. 3.

A round wire spring clip 65 is positioned between retainer pins 66 and has arcuate arms that interfit into the back face of the back gate 64 to resiliently urge the assembly 60 forward. The interfit between the spring arms and the back gate is such that the back gate can move laterally rearward and forward (i.e. normal to the plane of the aperture 38) during operation of the assembly 60. Upper and lower right-angled stops 70 and 72 protrude from the web 20 to receive the adjacent edges of the back gate to restrain the back gate against longitudinal movement (i.e. movement parallel to the plane of the aperture 38) and to limit the amount of lateral movement possible against the action of spring clip 65. The forward edge of the recess 56 is aligned with the sections of stops 70–72 that are parallel to aperture 38 to also limit the amount of lateral movement of the back gate.

As positioned by the stops 70–72, the back gate has a light beam aperture 68 aligned with the aperture 38, permitting light reflected from mirror 58 to pass through the filmstrip 28 and out through the aperture 38. The dimensions of this aperture 68 are substantially the same as the dimensions of the image frame of the filmstrip and therefore this aperture masks the reflected light beam to the size of the filmstrip image frame.

The front gate 62 is adapted to reciprocate longitudinally (i.e. parallel to the plane of aperture 38) between upper and lower stops 78 and 80 that protrude from the web 20 adjacent to the peripheral wall 18. Upper front gate stop 78 is adjacent to upper back gate stop 70 but lower front gate stop 80 is below lower back gate stop 72 so as to provide the necessary longitudinal reciprocating space for the front gate. When the front gate is in the upper position shown in FIG. 2, an image-projecting aperture 86 therein is aligned with aperture 38, permitting a film frame image to be projected through aperture 38. The dimensions of this aperture 86 are substantially the same as the dimensions of the filmstrip image frame and therefore this aperture masks the projected image and limits projection to the particular frame aligned with aperture 38. When the front gate is in its lower position, where it abuts the lower stop 80, the image-projecting aperture 86 is completely out of alignment with aperture 38 and therefore image projection through the aperture 38 is gated (i.e. prevented).

The front face of the front gate has a trigger provided in the form of a pair of protruding tabs 88 with a recess 90 therebetween that extends into the front gate. These tabs extend into the actuating aperture 40 on the forward side of the peripheral wall 18 and reciprocate up and down therein as the front gate reciprocates. When the cartridge 10 is inserted into suitably adapted projection apparatus, a rectilinear actuating mechanism within the projection apparatus will couple to the tabs 88 or the recess 90 (as by a pin extending into the recess 90). Thus, as the actuating mechanism reciprocates upward and downward, the front gate will be reciprocated thereby advancing the film, frame by frame, past the aperture 38. It is emphasized that such an actuating mechanism does not contact the film, but only couples to the trigger.

Arcuate film guideways are provided leading into and out of the film advance and image-gating assembly 60. The upper lead-in guideway is defined by arcuate inner and outer sections 92 and 94 that protrude from the web 20. The lower leadout guideway is defined by arcuate inner and outer sections 96 and 98 that protrude from the web 20. The arcuate inner sections 92 and 96 are interconnected by a rib 99 that also protrudes from the web 20 to serve as a barrier preventing the film strip 28 from interfering with or becoming damaged by the operating components previously described that are located forwardly of the rib 99. The side of cover 14 is also provided with protruding sections that are aligned with the sections 92, 94, 96, 98 and 99 to provide guideways and a barrier acting on the opposite edge of the filmstrip. Upper and lower arcuate rear guides 105 and 106 in the corners of wall 18 and corresponding upper and lower arcuate rear guides in the corners of lip 26 may be provided to prevent the filmstrip 28 from binding in the corners of the storage space behind the barrier ribs.

With the exception of the mirror 58, the film advance and image-gating assembly 60 and the spring clip 65, all of the elements referred to above are preferably molded into the cover 14 or into the container 12. Thus, assembly of the film side of this cartridge is extremely simple and convenient, being merely the gluing of the mirror 58 in position, the insertion of the spring clip 65 and the insertion of the front and back gates 62–64. The filmstrip 28 is then inserted between the front and back gates, into the lead-in and leadout guideways, and into the storage space behind the barrier ribs 99–104.

The structure of the front and back gates that accomplishes the frame by frame film advancement is shown in FIGS. 4–15.

Each of the film gates, front gate 62 and back gate 64, are preferably molded from a suitable plastic to the configurations shown, with the various cross-sectional thicknesses designed to prevent warpage resulting from molding. The adjacent inner surfaces of each gate are provided with a set of two parallel side rails, 110–112 for the front gate and 114–116 for the back gate, which have flat surfaces that are of a width approximately equal to the nonimage-containing side sections of the film that contain the rectangular film sprocket holes or slats. In between the side rails of each gate, the inner web surfaces thereof are recessed above (at 118 for the front gate and at 120 for the back gate) and below (at 122 for the front gate and at 124 for the back gate) the respective aperture, 86 or 68, with sloping transition surfaces therebetween as shown in FIGS. 6, 7 and 9. Each respective aperture, 86 or 68, is bounded on the inner face of its gate by the respective side rails and by upper and lower sections, 126–128 for the front gate and 130–132 for the back gate, that extend between the respective side rails. The inner faces of the sections 126–128–30–132 are flush with the faces of their respective side rails. The top and bottom ends of each side rail are tapered outward and away from the adjacent gate as shown in FIGS. 6–8.

The outer, rearward surface of the back gate is provided with upper and lower hollow conical protrusions 91 and 93 that receive the ends of the arcuate arms of spring 65. The back gate is also provided with relatively sharply inclined sidewalls 95 and 97 that slope inwardly to the plane of aperture 68 and less sharply inclined upper and lower walls 99 and 101 that also slope inwardly to the plane of aperture 68.

The front gate is provided with relatively sharply inclined side and upper and lower top walls 103–105 and 104–109 that slope inwardly to the plane of aperture 86.

The front gate is provided with an upper and a lower section of film-sprocket-hole–engaging teeth, each set comprising two teeth 134–136 and 138–140 that are positioned opposite one another, with one tooth on each side rail as shown in FIG. 6, and that protrude outwardly from the flat surface of their respective side rails. The teeth of the lower set flank the lower edge of the aperture 86 and the teeth of the upper set are positioned on their respective side rail about three-fourth of the distance toward the upper end from the lower set. Two sets of transverse grooves or notches are positioned equidistant between one another and between the upper and lower sets of teeth, each set comprising two grooves 142–144 and 146–148 that are positioned opposite one another, with one groove on each side rail as shown in FIG. 6, and that are formed in the flat surface of their respective side rail. Two additional sets of transverse grooves or notches are also positioned equidistant between one another below the lower set of teeth, each such set comprising two grooves 150–152 and 154–156 positioned opposite one another, with one groove on each side rail as shown in FIG. 6. The spacing between the adjacent teeth and grooves on each rail are equal to the spacing between the film sprocket holes.

The back is also provided with upper and lower sets of film-sprocket-hole-engaging teeth, each set comprising two teeth 160–162 and 164–166 that are positioned opposite one another, with one tooth on each side rail as shown in FIG. 7, and that protrude outwardly from the flat surface of their respective side rail. The teeth of the upper set flank the upper edge of the aperture 68 and the teeth of the lower set are positioned on their respective side rail about three-fourth of the distance toward the lower end from the upper set. Two sets of transverse grooves or notches are positioned equidistant between one another above the upper set of teeth, each set comprising two grooves 168–170 and 172–174 that are positioned opposite one another, with one groove on each side rail as shown in FIG. 7, and that are formed in the flat surface of their respective side rail. Two additional sets of transverse grooves also are positioned equidistant between one another and between the upper and lower sets of teeth, each such set comprising two grooves 176–178 and 180–182 positioned opposite one another, with one groove on each side rail as shown in FIG. 7. The spacing between the adjacent teeth and grooves on each rail are equal to the spacing between the film sprocket holes.

It is apparent from FIGS. 6–9 that, when the apertures 86 and 68 are aligned with the gates in operable face-to-face adjacency, the teeth on each rail surface protrude into grooves on the opposite gate. Thus, teeth 138–140 and 134–136 on the front gate will protrude into grooves 176–178 and 168–170, respectively, on the back gate. Likewise, teeth 160–162 and 164–166 on the back gate will protrude into grooves 146–148 and 154–156 on the front gate.

The operating sequence of the front and back gates is illustrates in FIGS. 12–15. FIG. 12 shows the apertures 86 and 68 aligned and film contained between the gates by the teeth protruding through the film sprocket holes into the respective grooves. In this configuration, the frame held between the gates for projection of its image is confined on the sides by the adjacent sections of the side rails 110–112–114–116 and is confined on the top and bottom by the sections 126–128–130–132 extending between the respective side rails. Thus, this frame is properly positioned and aligned with respect to the apertures 86 and 68 for projection.

When the front gate is moved downwardly (FIG. 13) the teeth will ride out of their respective grooves, the back gate being moved rearwardly against the action of the arcuate arms of spring 65. The front gate teeth will remain inserted through the film sprocket holes and the film will be advanced with the front gate. The back gate teeth now contact the film between the film sprocket holes to maintain the film against the front gate and retained by the front gate teeth. It will be noted that as the front gate aperture is moved downwardly, the projected image will also move downward out of alignment with the cartridge aperture 38, but that the "next image frame" being advanced into alignment with cartridge aperture 38, will not be projectable because the solid front gate section above aperture 86 will move into alignment with cartridge aperture 38 along with the next image frame.

When the film has been advanced one frame, (FIG. 14), the teeth will protrude into the now adjacent grooves, the back gate will move forwardly under the action of spring 65, and the film will be confined as in FIG. 12, except that apertures 86 and 68 will be completely out of alignment so that no image projection can occur.

When the front gate is advanced upward (FIG. 15), the teeth will again ride out of registry with the grooves, the back gate being moved rearwardly against the action of spring 65. The back gate teeth will remain inserted through the film sprocket holes and the film held stationary with the back gate. The front gate teeth now contact the film between the film sprocket holes to maintain the film against the back gate and retained by the back gate teeth. As the front gate aperture 86 moves into alignment with the cartridge aperture 38, the previously referenced "next image frame," or "newly advanced frame," will progressively exposed for projection.

When the front gate returns to its FIG. 12 position, the teeth will protrude into the adjacent grooves and the back gate will move forward under the action of spring 65 to shift the "next image frame" into its proper projection plane. The apertures 86 and 68 again will be aligned for image projection of the "newly advanced frame."

The teeth preferably are adapted to closely fit the film sprocket holes. They have an acute leading edge rake angle such that the trailing edges of the teeth are also inclined in the direction of film advance. Thus, the film is carried by the leading edges of the front gate teeth when the front gate advances the film one frame, and the film sprocket holes previously overlying the back gate teeth are drawn from the back gate teeth over the trailing edges of such teeth. When the front gate returns to its image projection position after having advanced the film one frame, the film is retained against the leading edges of the back gate teeth, and the front gate teeth, previously inserted through the film sprocket holes, are drawn out of the sprocket holes.

All of the teeth are preferably identical and have the structure shown in FIGS. 10 and 11. Each tooth has an inclined leading edge 1 with an acute, or positive, rake angle as shown in FIG. 14, a round leading tip 2, a rectangular flat end 3, an inclined trailing edge 4 with an obtuse, or negative, rake angle as shown in FIG. 11, a relatively sharply inclined outer side edge 5, and a less sharply inclined inner side edge 6. The steepness of the outer side edges facilitate the alignment and positioning of the film on the teeth both during and between periods of film advancement. The slope of edges 6 is preferably the same as the transition surface between the side rail, from which the tooth protrudes, and the recessed surface between the side rails. The edges 6 are thus extensions of such transition surfaces, the more gradual slope of which facilitate insertion and removal of the film between the gates in that the film edges are not damaged by traverse of these side edges. The flatness of the ends reduces film abrasion due to relative movement between the teeth and the film as the film is advanced. The positive rake angle of the leading edges facilitates retention of the film on the proper teeth. The negative rake angle of the trailing edges facilitates withdrawal of those teeth on which the film is not to be retained during the film advance cycle.

All of the grooves are identical in cross section as shown in FIG. 11, comprising upper and lower inwardly sloping sides 7, respectively, and a flat bottom 8. The slope of the sides is the same as the slope of the teeth trailing edges 4 and the bottom is slightly wider, top to bottom, than the width of teeth flat ends 3. The depth of the grooves is such that a small clearance is provided between the groove bottoms 8 and the teeth flat ends 3 parallel thereto, and between groove sides and the teeth trailing edges 4 paralleled thereto, such clearances being less than the differences in top-to-bottom width between the groove bottoms 8 and the teeth flat ends 3. Thus, movement of the front gate downward from the FIG. 12 position will cause the trailing edges of the back gate teeth to contact the adjacent upper sides of the front gate grooves to force the back gate rearward as the front gate back gate teeth ride out of their respective grooves. Likewise, movement of the front gate upward from the FIG. 14 position will cause the trailing edges of the front gate teeth to contact the adjacent upper sides of the back gate grooves to force the back gate rearward as the front gate and back gate teeth ride out of their respective grooves.

In both directions of front gate movement, it will be noted, the tips of the teeth leading edges do not contact the sides of the grooves and thus will not become worn or abraded as might be the case if such contact existed. Inasmuch as the teeth are identical in height, the film-retaining teeth will clear the opposing gate by the thickness of the film during front gate transitional movement, as shown in FIGS. 13 and 15.

Two sets of teeth on each gate are preferred. Two sets on the gate that retains the film will ensure that the film is retained even if a splice reduces or eliminates the necessary film sprocket hole engagement of the leading edges of the teeth of one set. Two sets on the gate that does not retain the film ensure that the sliding contact between the teeth and the film will occur only between the film sprocket holes and not across the image frames.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

For example, the film could be provided as on a spool as an endless coil.

The embodiments of the invention in which an exclusive property or privilege is claimed are defined as follows:

1. A film advance assembly for multiframe film which comprises a longitudinally movable first means having an aperture therein, and a second means having an aperture therein, the first and second means having cooperating adjacent sides adapted to contain a section of multiframe film therebetween and to advance the film when the first means is movable longitudinally and wherein the cooperating adjacent sides of said first and second means are each provided with cooperable film-sprocket-hole-engaging teeth and grooves adapted to receive teeth of the other side; said teeth and grooves being so arranged that film is carried by said first means when said first means is moved so as to transfer the first means aperture out of alignment with the second means aperture, and being so arranged that film is retained by said second means when said first means is moved so as to transfer the first means aperture into alignment with the second means aperture.

2. The assembly of claim 1 wherein each tooth is provided with a leading edge oriented in the direction of film advance and having a positive rake angle, and a trailing edge having a negative rake angle; and wherein the grooves are so designed that the trailing edges of the teeth, that are withdrawn from film sprocket holes during movement of said first means, contact the sides of grooves in the opposing side to effect relative movement of such side transversely away from the aperture of the other means whereby the film is not engaged around said aperture by said cooperating adjacent sides during longitudinal movement of said first means.

3. The assembly of claim 1 wherein each tooth is provided with a relatively steeply inclined outer side edge, a relatively less steeply inclined inner side edge, and a flattened tip.

4. The assembly of claim 1 wherein said first and second means each comprise a gate member provided with parallel, film-contacting side rails in and on which said grooves and teeth are provided; and comprise parallel film-contacting crossrails which, with intermediate sections of the side rails, define the respective apertures.

5. The assembly of claim 4 wherein a set of two teeth on one member flank one edge of its aperture and a set of two teeth on the other member flank the opposite edge of its aperture such that a film frame may be retained by the two sets of teeth and confined on both sides by said crossrails and intermediate sections of said side rails when the two apertures are aligned.

6. A film advance assembly for multiframe film which comprises a longitudinally movable first gate member having a pair of parallel side rails provided on one side thereof, an aperture positioned between the side rails, at least one tooth protruding from each side rail, and at least two grooves provided in each rail; and a second gate member having a pair of parallel side rails provided on one side thereof, an aperture positioned between the side rails, at least one tooth protruding from each side rail, and at least two grooves provided in each rail; the teeth and grooves on and in each side rail being so positioned that when the rails on each gate member are juxtapositioned in face-to-face adjacency, the teeth of each gate member interfit into grooves of the other gate member when the two apertures are aligned and interfit into other grooves of the other gate member when the two apertures are out of alignment by one film frame.

7. The assembly of claim 6 wherein each tooth is provided with a leading edge oriented in the direction of film advance and having a positive rake angle, and a trailing edge having a negative rake angle; and wherein the grooves are so designed that the trailing edges of the teeth, that are withdrawn from film sprocket holes during movement of said first means, contact the sides of grooves in the opposing side to effect relative movement of such side transversely away from the aperture of the other means.

8. The assembly of claim 6 wherein each tooth is provided with a relatively steeply inclined outer side edge, a relatively less steeply inclined inner side edge, and a flattened tip.

9. The assembly of claim 6 wherein two parallel film-contacting crossrails are provided between the side rails of each gate member which, with intermediate sections of the side rails, define the respective apertures and wherein said film-contacting crossrails are separated each time said first gate member is moved longitudinally.

10. The assembly of claim 9 wherein a set of two teeth on one member flank one edge of its aperture and a set of two teeth on the other member flank the opposite edge of its aperture such that a film frame may be retained by the two sets of teeth and confined on both sides by said crossrails and intermediate sections of said side rails when the two apertures are aligned.

11. A film advance assembly for multiframe film which comprises first means having an aperture therein, and a second means having an aperture therein, the first and second means having cooperating adjacent confronting sides to engage the film for containing and guiding a section of multiframe film therebetween and means provided on said first means for advancing the film when the first means is moved lengthwise of the film relative to the second means.

12. The film advance assembly defined by claim 11 wherein said apertures in said first and second means are aligned in one operative position of said first and second means and are moved out of alignment when the first means is moved longitudinally.

13. A film advance assembly for multiframe film having a plurality of spaced driving holes comprising first means for engagement within a driving hole of said film for moving said film in a predetermined direction, second means for engagement with a driving hole of said film for holding said film against movement in the opposite direction; first and second confining surfaces integrally formed adjacent said respective first and second driving hole engagement means for engaging opposite sides of the film therebetween; and means for withdrawing said second means from the driving hole and moving said second means along the film holding the film against said first confining surface when said first means is drivingly engaging a driving hole of said film.

14. A film advance assembly for multiframe film having a plurality of spaced driving holes comprising first means for engagement within a driving hole of said film and for moving said film in a predetermined direction, second means for engagement within a driving hole of said film for holding said film against movement in the opposite direction; and means for withdrawing said second means when said first means is drivingly engaging said film, and wherein said first and second means project through said driving holes from opposite directions and are spring biased toward one another, said withdrawing means including means on said first means for moving said second means away from said first means.

15. The film advance assembly of claim 13 wherein said first and second confining surfaces include grooves operable to be engaged by said first means to urge said second means out of said driving holes as said first means is moved in said predetermined direction.

16. A film advance assembly for multiframe film comprising first means, said first means being movable relative to said second means lengthwise of the film, the first and second means having cooperating confronting sides in face-to-face adjacency for contacting the film and for confining and guiding the film, and means carried by said first means adjacent said confronting side of said first means and movable with said confronting side of said first means for advancing the film when said first means and its confronting side are moved lengthwise of the film relative to said second means and its confronting side.

17. The film advance assembly of claim 16 said film having sprocket holes, said first means being mounted for rocking movement by said film toward and away from said second means, and said advancing means including at least two longitudinally spaced film-sprocket-hole-engaging teeth whereby rocking movement of said first means by said film provides at least one of said teeth in engagement with a sprocket hole in said film.